United States Patent
Savord et al.

(10) Patent No.: US 9,689,973 B2
(45) Date of Patent: Jun. 27, 2017

(54) ACOUSTIC PROBE WITH COMPONENTS OF ACOUSTIC ELEMENTS HAVING DIFFERENT PITCHES THAN EACH OTHER

(71) Applicant: KONINKLIJKE PHILIPS N.V., Eindhoven (NL)

(72) Inventors: Bernard Joseph Savord, Andover, MA (US); William Ossmann, Acton, MA (US); Wojtek Sudol, Andover, MA (US); Michael Scarsella, Amesbury, MA (US); George Anthony Brock-Fisher, Andover, MA (US)

(73) Assignee: Koninklijke Philips N.V., Eindhoven (NL)

( * ) Notice: Subject to any disclaimer, the term of this patent is extended or adjusted under 35 U.S.C. 154(b) by 191 days.

(21) Appl. No.: 14/654,877

(22) PCT Filed: Dec. 23, 2013

(86) PCT No.: PCT/IB2013/061283
§ 371 (c)(1),
(2) Date: Jun. 23, 2015

(87) PCT Pub. No.: WO2014/102712
PCT Pub. Date: Jul. 3, 2014

(65) Prior Publication Data
US 2015/0338511 A1 Nov. 26, 2015

Related U.S. Application Data

(60) Provisional application No. 61/746,624, filed on Dec. 28, 2012.

(51) Int. Cl.
*G01S 7/52* (2006.01)
*G01S 15/02* (2006.01)
*B06B 1/06* (2006.01)

(52) U.S. Cl.
CPC ........ *G01S 7/52019* (2013.01); *B06B 1/0622* (2013.01); *B06B 1/0629* (2013.01); *G01S 7/52023* (2013.01); *G01S 15/02* (2013.01)

(58) Field of Classification Search
CPC ..... B06B 1/0622; B06B 1/0629; G01S 15/02; G01S 7/52019; G01S 7/52023
See application file for complete search history.

(56) References Cited

U.S. PATENT DOCUMENTS

2008/0106976 A1 5/2008 Davidsen
2008/0273424 A1 11/2008 Wodnicki
(Continued)

FOREIGN PATENT DOCUMENTS

CN 104955586 A * 9/2015 .......... B06B 1/0622
JP 2011110111 A 6/2011
(Continued)

*Primary Examiner* — Daniel Pihulic

(57) ABSTRACT

An acoustic probe includes a plurality of acoustic array components separated and spaced apart from each other. Each of the acoustic array components includes: an array of acoustic element circuits disposed contiguous to each other at a first pitch; a plurality of pads each corresponding to one of the acoustic element circuits and formed within a circuitry area of the corresponding acoustic element circuit, the pads being disposed at a second pitch; a plurality of interconnection bumps each corresponding to one of the pads and being disposed in electrical connection with the corresponding pad, wherein the interconnection bumps are disposed at a third pitch; and a plurality of acoustic transducer elements on the interconnection bumps. The acoustic transducer elements are disposed at a fourth pitch. At least two of the first, second, third, and fourth pitches are different than each other.

21 Claims, 14 Drawing Sheets

(56) References Cited

U.S. PATENT DOCUMENTS

| | | | |
|---|---|---|---|
| 2009/0093722 A1 | 4/2009 | Takeuchi | |
| 2010/0154190 A1* | 6/2010 | Sanger | B41J 2/1603 29/428 |
| 2010/0156243 A1* | 6/2010 | Weekamp | H01L 25/16 310/334 |
| 2010/0317972 A1* | 12/2010 | Baumgartner | G10K 11/002 600/459 |
| 2011/0071397 A1 | 3/2011 | Wodnicki | |
| 2015/0338511 A1* | 11/2015 | Savord | B06B 1/0622 367/135 |

FOREIGN PATENT DOCUMENTS

| | | | | | |
|---|---|---|---|---|---|
| NL | WO 2014102712 | A2 * | 7/2014 | ........... | B06B 1/0622 |
| NL | WO 2014102712 | A1 * | 11/2014 | ........... | B06B 1/0622 |
| NL | EP 2938440 | A2 * | 11/2015 | ........... | B06B 1/0622 |

* cited by examiner

ACOUSTIC PROBE WITH COMPONENTS OF ACOUSTIC ELEMENTS HAVING DIFFERENT PITCHES THAN EACH OTHER

CROSS-REFERENCE TO PRIOR APPLICATIONS

This application is the U.S. National Phase application under 35 U.S.C. §371 of International Application No. PCT/IB2013/061283, filed on Dec. 23, 2013, which claims the benefit of U.S. Provisional Patent Application No. 61/746,624, filed on Dec. 28, 2012. These applications are hereby incorporated by reference herein.

TECHNICAL FIELD

This invention pertains to an acoustic probe, and in particular to an acoustic probe having an array for acoustic transducers or elements and corresponding acoustic element circuits.

BACKGROUND AND SUMMARY

Acoustic (e.g., ultrasound) imaging systems are being employed in an increasing number of contexts. An acoustic imaging system generally employs an acoustic probe for providing the acoustic beam to the area to be imaged and to receive the acoustic wave back from that area. An acoustic probe may employ an acoustic array to generate an acoustic beam which can be focused and steered to an area of interest. Acoustic arrays may be configured as a single row of acoustic elements, a one-dimensional (1D) array for imaging a two dimensional (2D) image plane, or as a two dimensional (2D) array for imaging a three dimensional region. Each of these acoustic elements includes an acoustic transducer element, and a corresponding acoustic element circuit. A 2D array comprises acoustic elements extending in both azimuth and elevation directions which can be operated fully independently to both focus and steer beams in any azimuth or elevation direction. These arrays can be configured in either flat or curved orientations.

Among the important parameters of an acoustic array that affect the performance of the acoustic probe and the acoustic imaging system are the pitch or spacing between adjacent acoustic elements and the size of the acoustic array. In particular, it is desired in some applications to provide a large acoustic array with a small pitch between adjacent acoustic elements. However, from a practical standpoint, it is difficult to produce a single semiconductor die to realize an acoustic array which is as large as might be desired. Furthermore, mounting a large semiconductor die on the curved surface of the housing of an acoustic probe can be problematic.

Accordingly, it would be desirable to provide an acoustic probe which includes a large acoustic array with small pitches between adjacent acoustic elements. It would further be desirable to provide a semiconductor die which can be employed in such an acoustic array. It would still further be desirable to provide a semiconductor wafer on which one or more such die can be fabricated.

In one aspect of the invention, a device comprises an acoustic probe having a plurality of acoustic array components separated and spaced apart from each other. Each of the acoustic array components comprises: an array of acoustic element circuits disposed contiguous to each other at a first pitch in at least a first direction; a plurality of pads each corresponding to one of the acoustic element circuits and formed within a circuitry area of the corresponding acoustic element circuit, the pads being arranged at a second pitch in at least the first direction; a plurality of interconnection bumps each corresponding to one of the pads and being disposed in electrical connection with the corresponding pad, wherein the interconnection bumps are disposed at a third pitch in at least the first direction; and a plurality of acoustic transducer elements on the interconnection bumps, wherein the acoustic transducer elements are disposed at a fourth pitch in at least a first direction, and wherein at least two of the first, second, third, and fourth pitches are different than each other.

In some embodiments, the third pitch is greater than the second pitch.

In some embodiments, the fourth pitch is greater than the third pitch.

In some embodiments, the second pitch is greater than the first pitch.

In some versions of these embodiments, the second pitch, third pitch, and fourth pitch are approximately the same as each other.

In some versions of these embodiments, the fourth pitch is substantially the same as the second pitch and the third pitch is greater than the fourth pitch.

In some versions of these embodiments, the second pitch is approximately the same as the first pitch.

In some versions of these embodiments, the third pitch is approximately the same as the first pitch, and the fourth pitch is greater than the first pitch.

In some versions of these embodiments, the third pitch is greater than the first pitch, and the fourth pitch is approximately the same as the third pitch.

In some embodiments, at least a first acoustic array component and a second acoustic array component among the plurality of acoustic array components are provided together on a common semiconductor substrate, wherein the pads of the first and second acoustic array components together form an array of pads, and wherein the pads of the first and second acoustic array components have a substantially uniform pitch throughout the array of pads.

In some versions of these embodiments, the acoustic transducer elements of the first and second acoustic array components together form an array of acoustic transducer elements, and wherein the acoustic transducer elements of the first and second acoustic array components have a substantially uniform pitch throughout the array of acoustic transducer elements.

In some embodiments, at least a first acoustic array component and a second acoustic array component among the plurality of acoustic array components are provided on different semiconductor substrates than each other, wherein the pads of the first and second acoustic array components together form an array of pads, and wherein the pads of the first and second acoustic array components have a substantially uniform pitch throughout the array of pads.

In some versions of these embodiments, the acoustic transducer elements of the first and second acoustic array components together form an array of acoustic transducer elements, and wherein the acoustic transducer elements of the first and second acoustic array components have a of acoustic transducer elements uniform pitch throughout the array of acoustic transducer elements.

In another aspect of the invention, a device comprises: a substrate including at least first and second circuit regions, wherein the first circuit region and the second circuit region are separated and spaced apart from each other by a scribing lane for scribing die from the substrate. Each of the circuit regions comprises: an array of acoustic element circuits disposed at a first pitch in at least a first direction; and a plurality of pads each corresponding to one of the acoustic element circuits and formed within a circuitry area of the corresponding acoustic element circuit, wherein the pads of the first and second circuit regions together form an array of pads having a substantially uniform pitch in at least the first direction throughout the array of pads, where the uniform pitch is a second pitch which is greater than the first pitch.

In some embodiments, the array of acoustic element circuits includes: a first acoustic element circuit at a first end of the array, the first acoustic element having a corresponding first pad; and a last acoustic element circuit at a second end of the array which is opposite the first end of the array, the last acoustic element having a corresponding last pad, wherein the first and last pads are disposed along opposite sides of the corresponding acoustic element circuits with respect to each other.

In some embodiments, the substrate includes at least third and fourth circuit regions, wherein the first, second, third, and fourth circuit regions form a two dimensional array and are separated and spaced apart from each other by one or more scribing lanes.

In some embodiments, the device further comprises a plurality of interconnection bumps each corresponding to one of the pads and being disposed in electrical connection with the corresponding pad.

In some versions of these embodiments, the device further comprises a plurality of acoustic transducer elements on the interconnection bumps, wherein the interconnection bumps.

In yet another aspect of the invention, a device comprises: an array of acoustic element circuits disposed on a substrate at a first pitch in at least a first direction; and a plurality of pads each corresponding to one of the acoustic element circuits and formed within a circuitry area of the corresponding acoustic element circuit, the pads being disposed at a second pitch in at least the first direction, wherein the second pitch is greater than the first pitch.

In some embodiments, the array of acoustic element circuits includes: a first acoustic element circuit at a first end of the array, the first acoustic element having a corresponding first pad; and a last acoustic element circuit at a second end of the array which is opposite the first end of the array, the last acoustic element having a corresponding last pad, wherein the first and last pads are disposed along opposite sides of the corresponding acoustic element circuits with respect to each other.

In some embodiments, the device further comprises: a plurality of interconnection bumps each corresponding to one of the pads and being disposed in electrical connection with the corresponding pad; and a plurality of acoustic transducer elements disposed on the interconnection bumps.

DETAILED DESCRIPTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention. Within the present disclosure and claims, when something is said to have "approximately" a certain value, then it means that it is within 2% of that value when something is said to have "about" a certain value, then it means that it is within 10% of that value, and when something is said to have "substantially" a certain value, then it means that it is within 25% of that value.

Figure 1:
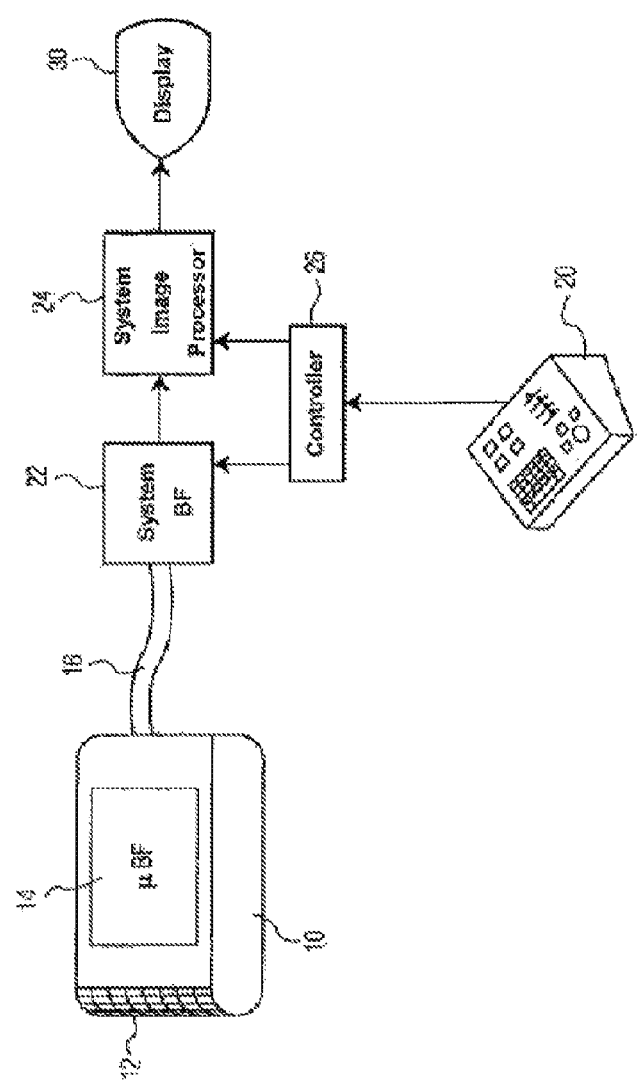
FIG. 1 illustrates in block diagram form an acoustic imaging system including an acoustic probe with a curved two dimensional acoustic array.

FIG. 1 illustrates in block diagram form an acoustic imaging system 1. Acoustic imaging system 1 includes an acoustic probe 10 with a curved two dimensional acoustic array 12, connected via a cable 16 to a system beamformer 22, which is in turn connected to a controller 24 and a system image processor 24. Acoustic imaging system 1 also includes user controls 20 and a display 30.

Acoustic probe 10 includes a two dimensional acoustic array 12, which in this example is curved in the elevation dimension. Under the ultimate control of controls 20, the acoustic elements of acoustic array 12 transmit acoustic one or more acoustic beams in the desired directions and to the desired focal points in the three dimensional image field in front of acoustic array 12. Echoes from the transmitted beams may be received by the acoustic transducer elements of acoustic array 12. Output signals of acoustic array 12 are provided via cable 16 to system beamformer 22, to ultimately generate an image which is displayed on display 30.

Figure 2:
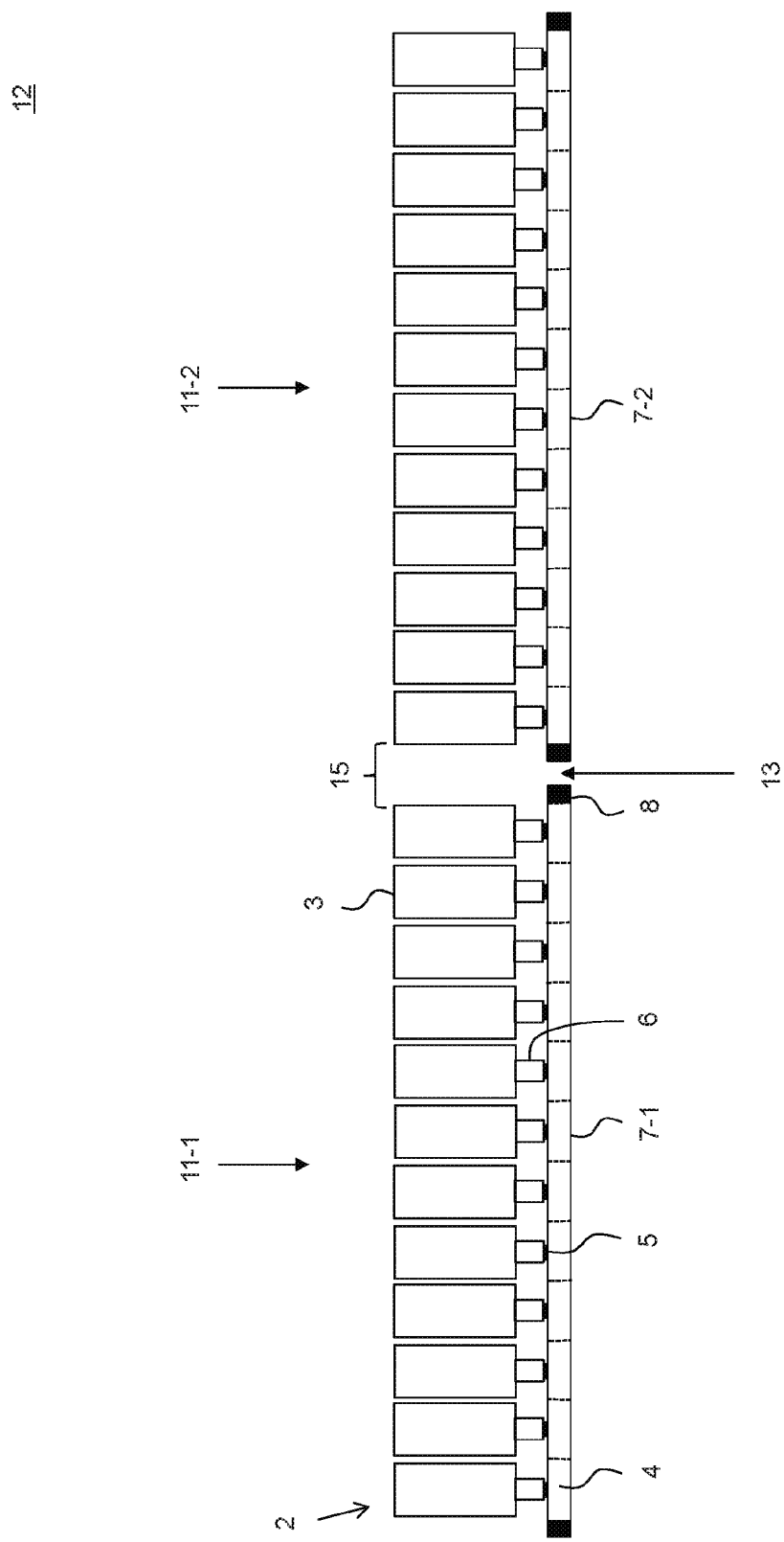
FIG. 2 illustrates a portion of an acoustic array.

FIG. 2 illustrates a portion of an acoustic array 12 which may be employed in acoustic imaging system 1. Acoustic array 12 comprises two or more acoustic array components, two of which are illustrated in FIG. 2 as first acoustic array component 11-1 and second acoustic array component 11-2. It should be understand that in general, acoustic array 12 may comprise any number of acoustic array components arranged in one or two dimensional arrays. First and second acoustic array components 11-1 and 11-2 each comprise an array of acoustic elements 2. Each acoustic element 2 includes an acoustic transducer element 3, and a corresponding acoustic element circuit 4 for coupling an electrical signal to acoustic transducer element 3 and receiving an electric signal from acoustic transducer element 3. Each acoustic element circuit 4 has a corresponding pad 5 formed within a circuitry area of the corresponding acoustic element circuit. Each acoustic element 2 further includes an interconnection bump 6 providing an electrical connection between the corresponding pad 5 and the corresponding acoustic transducer element 3.

As shown in FIG. 2, first and second acoustic array components 11-1 and 11-2 are provided on corresponding first and second semiconductor dies 7-1 and 7-2 where corresponding groups of the acoustic element circuits 4 are provided contiguous to each other. As shown in FIG. 2, each of the semiconductor dies 7-1 and 7-2 include a border 8 along each edge thereof corresponding to a scribe lane on the original semiconductor wafer from which the dies were produced.

First and second acoustic array components 11-1 and 11-2 may be provided on a surface of an acoustic probe, for example a curved surface.

Due to the need for mechanical overhead and tolerances, first and second acoustic array components 11-1 and 11-2 are separated and spaced apart from each other by a space 13.

Accordingly, due to the border 8 and the space 13, there is a gap 15 between the acoustic transducer element 3 at one edge of first acoustic array component 11-1 and the adjacent acoustic transducer element 3 at the adjacent and opposite edge of second acoustic array component 11-2. This gap is undesirable and prevents construction of a uniform array of acoustic elements 2 when the acoustic elements are provided on two or more semiconductor dies. The description to follow with respect to FIGS. 3 and 11 discloses one or more embodiments which may overcome this problem.

Figure 3:
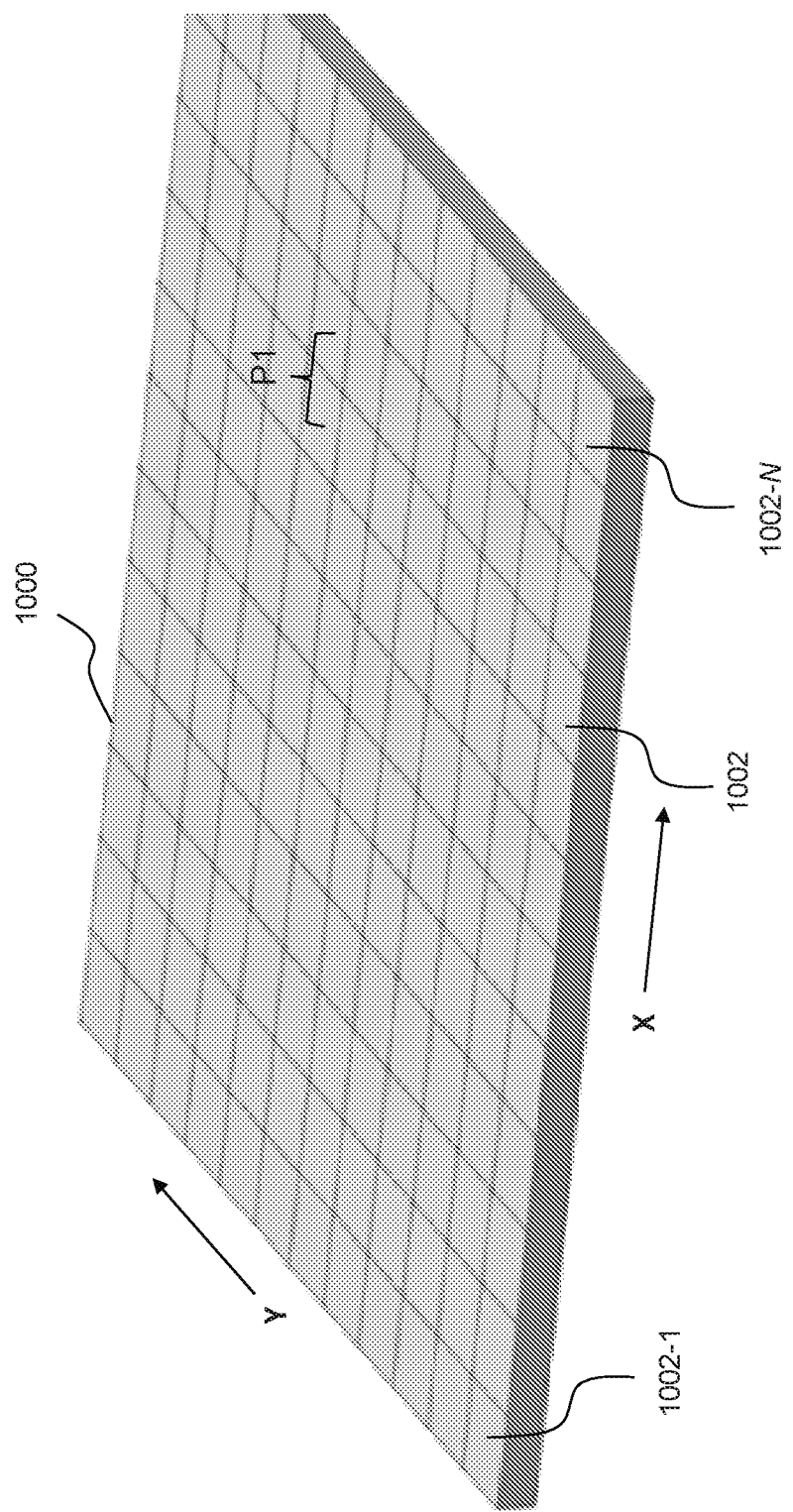
FIG. 3 illustrates an example embodiment of a circuit region of a substrate, where the circuit region includes an array of acoustic element circuits.

FIG. 3 illustrates an example embodiment of a circuit region 1000 of a substrate, where circuit region 1000 includes an array of acoustic element circuits 1002. Here, acoustic element circuits 1002 are disposed contiguous to each other at a first pitch P1. Here, "pitch" is understood to mean an average spacing between the centers of two elements which are closest to each other, allowing for the case of a uniform spacing as well as any other distribution with the same location of the end elements as a uniformly spaced distribution would have. When we say that two pitches are different, we mean they have different end points and the distribution within the end points can be arbitrary. In particular, the first pitch P1 represents the average spacing between the centers of two elements which are closest to each other (i.e., adjacent). In some embodiments, the first pitch P1 may be uniform or substantially uniform among acoustic element circuits 1002 of circuit region 1000.

FIG. 3 illustrates an embodiment where the array of acoustic element circuits 1002 is a two-dimensional array arranged in M rows each extending in the X direction and N columns each extending in the Y direction, where each row includes a first acoustic element circuit 1002-1 at a first end thereof, and a last acoustic element circuit 1002-N at a second (opposite) end thereof. Here, acoustic element circuits 1002 are disposed contiguous to each other at the first pitch P1 in both the X direction and the Y direction. However, in some embodiments the array may be linear, or acoustic element circuits 1002 may have the first pitch P1 only in one direction.

Figure 4:
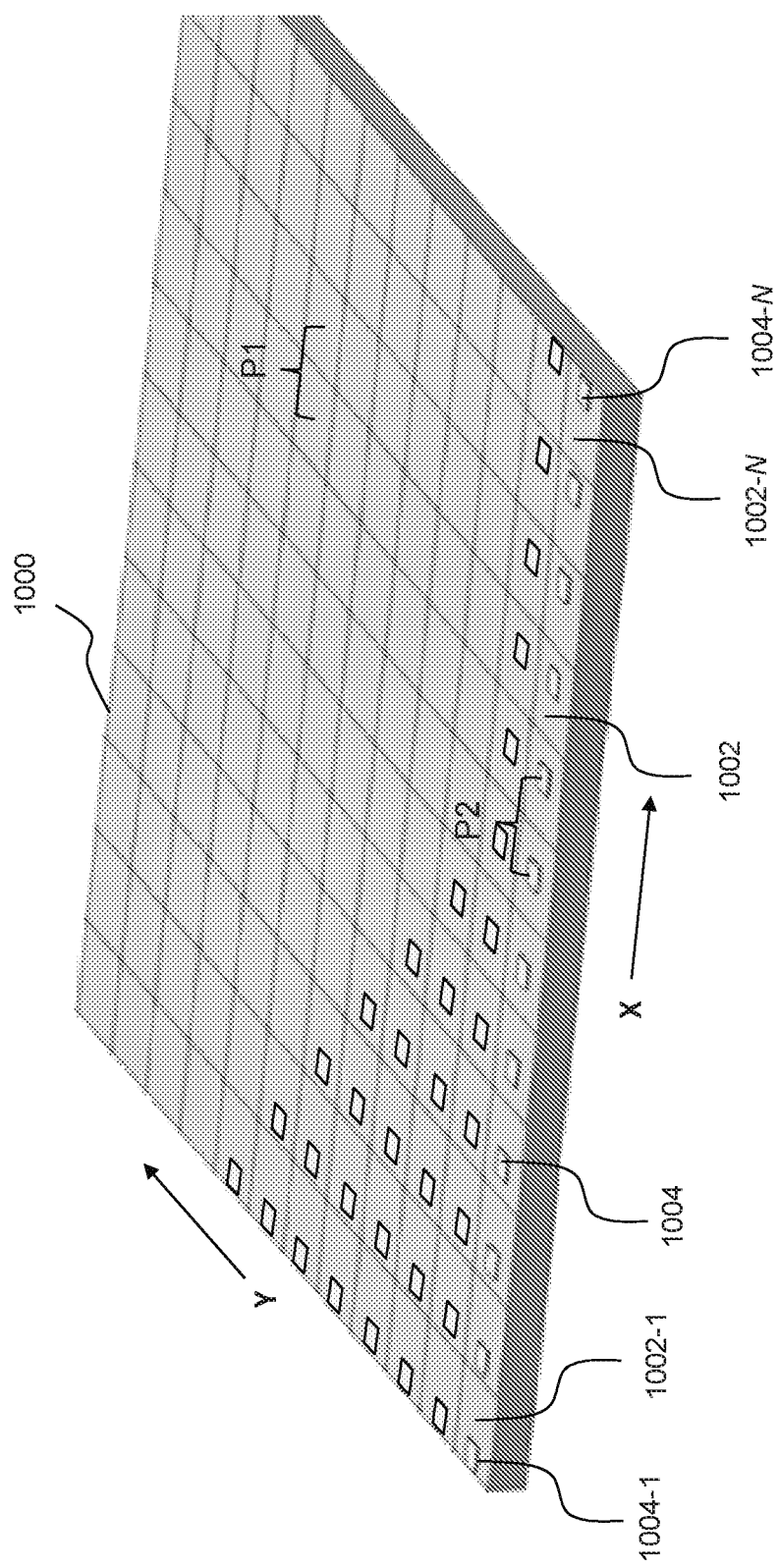
FIG. 4 illustrates an example embodiment of a circuit region of a substrate, where the circuit region includes an array of acoustic element circuits each having a corresponding pad.

FIG. 4 illustrates an example embodiment of a circuit region 1000 of a substrate, where circuit region 1000 includes an array of acoustic element circuits 1002 each having a corresponding pad 1004. Each pad 1004 is provided for electrical interconnection between the corresponding acoustic element circuit 1002 and a corresponding external component, for example an acoustic transducer element. For simplicity of illustration FIG. 4 only shows pads 1004 for some of acoustic element circuits 1002, including the first row of the array of acoustic element circuits 1002, from a first pad 1004-1 for first acoustic element circuit 1002-1, to a last pad 1004-N for last acoustic element circuit 1002-N. However it should be understood that in general each of the acoustic element circuits 1002 has its own corresponding pad 1004.

As illustrated in FIG. 4, pads 1004 form an array of pads 1004 disposed at a second pitch P2 Here, again, "pitch" is understood to mean an average spacing between the centers of two elements which are closest to each other, allowing for the case of a uniform spacing as well as any other distribution with the same location of the end elements as a uniformly spaced distribution would have. In particular, the second pitch P2 represents the average spacing between the centers of two elements which are closest to each other (i.e., adjacent). In some embodiments, the second pitch P2 may be uniform or substantially uniform among pads 1004. In FIG. 4, pads 1004 are disposed at the second pitch P2 in both the X direction and the Y direction. However, in some embodiments the array may be linear, or pads 1004 may have the second pitch P2 only in one direction.

Significantly, as shown in FIG. 4 the second pitch P2 of pads 1004 is greater than the first pitch P1 of acoustic element circuits 1002. As a result, in the specific embodiment illustrated in FIG. 4, first pad 1004-1 and last pad 1004-N are disposed along opposite sides of the corresponding acoustic element circuits 1002-1 and 1002-N with respect to each other.

Figure 5:
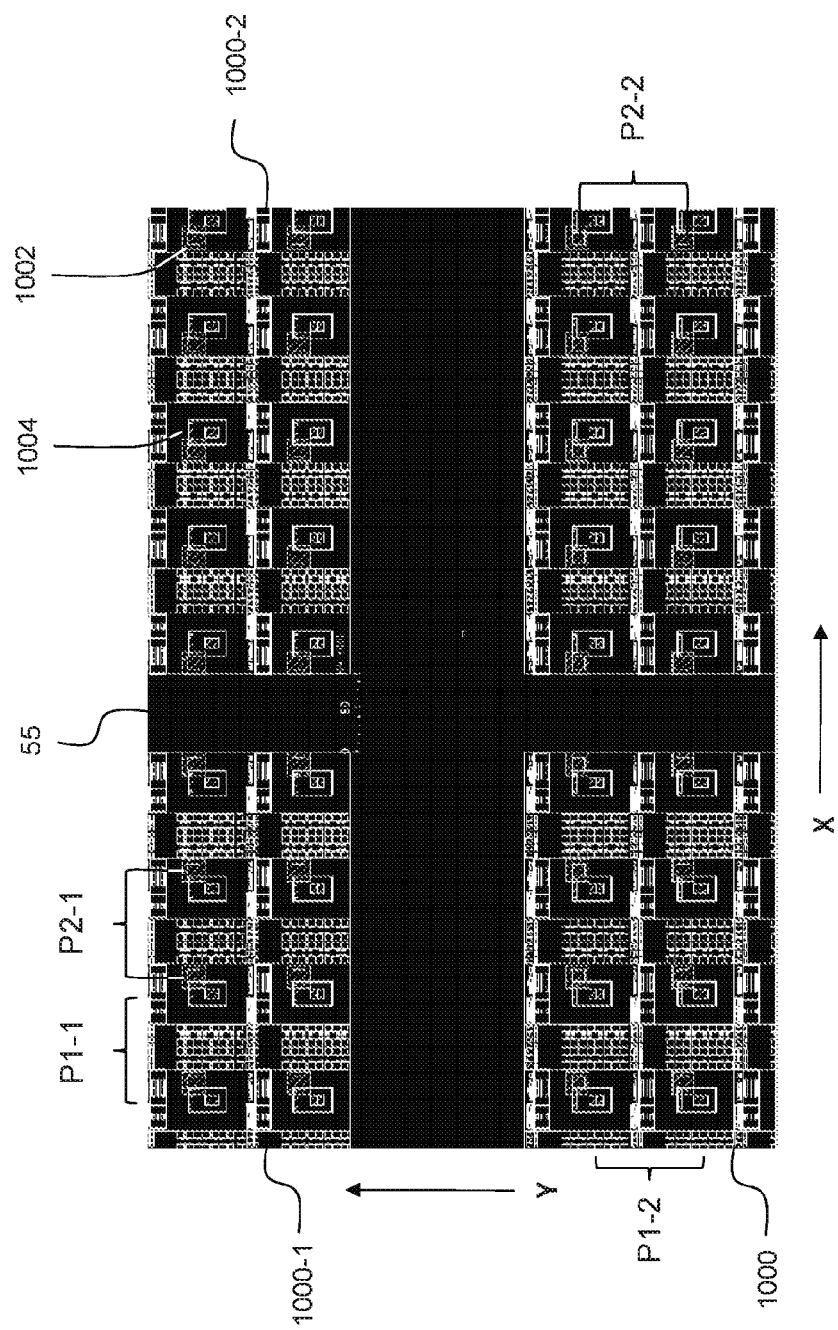
FIG. 5 illustrates a portion of an example embodiment of a semiconductor wafer including a plurality of circuit regions, where each circuit region includes an array of acoustic element circuits each having a corresponding pad.

FIG. 5 illustrates a portion of an example embodiment of a semiconductor wafer comprising a substrate 50 having a plurality of circuit regions 1000, including a first circuit region 1000-1 and a second circuit region 1000-2 which are separated and spaced apart from each other by a scribe lane 55. In general, substrate 50 includes a plurality of circuit regions, including third and fourth circuit regions, wherein the first, second, third, and fourth circuit regions form a two dimensional array and are separated and spaced apart from each other by one or more scribing lanes 55.

Each circuit region 1000 includes an array of acoustic element circuits 1002 having the first pitch P1-1 in the X direction. Each acoustic element circuit 1002 has a corresponding pad 1004 formed within a circuitry area of the corresponding acoustic element circuit 1002. As shown in FIG. 5, pads 1004 are disposed at the second pitch P2-1 in the X direction, where the second pitch P2-1 is greater than the first pitch P1-1. As a result, in the specific embodiment illustrated in FIG. 5, first pad 1004-1 and last pad 1004-N in each row of each circuit region 1000 are disposed along opposite sides of the corresponding acoustic element circuits 1002-1 and 1002-N with respect to each other.

Significantly, in some embodiments, pads 1004 of first and second circuit regions 1000-1 and 1000-2 together form an array of pads 1004, wherein pads 1004 of first and second circuit regions 1000-1 and 1000-2 may have a uniform or substantially uniform pitch throughout the array of pads 1004 in at least the X direction, where the uniform or substantially uniform pitch is the second pitch P2-1.

FIG. 5 shows that acoustic element circuits 1002 and pads 1004 are each disposed in a two dimensional array of rows and columns, extending respectively in the X direction and Y direction. Accordingly, the array of acoustic element circuits 1002 has the pitch P1-1 in the X direction and a pitch P1-2 in the Y direction. In some embodiments, P1-1 is the same as P1-2. However, in some embodiments P1-1 may be different than P1-2. Similarly, the array of pads 1004 has the pitch P2-1 in the X direction and a pitch P2-2 in the Y direction. In some embodiments, P2-1 is the same as P2-2. However, in some embodiments P2-1 may be different than P2-2.

Figure 6:
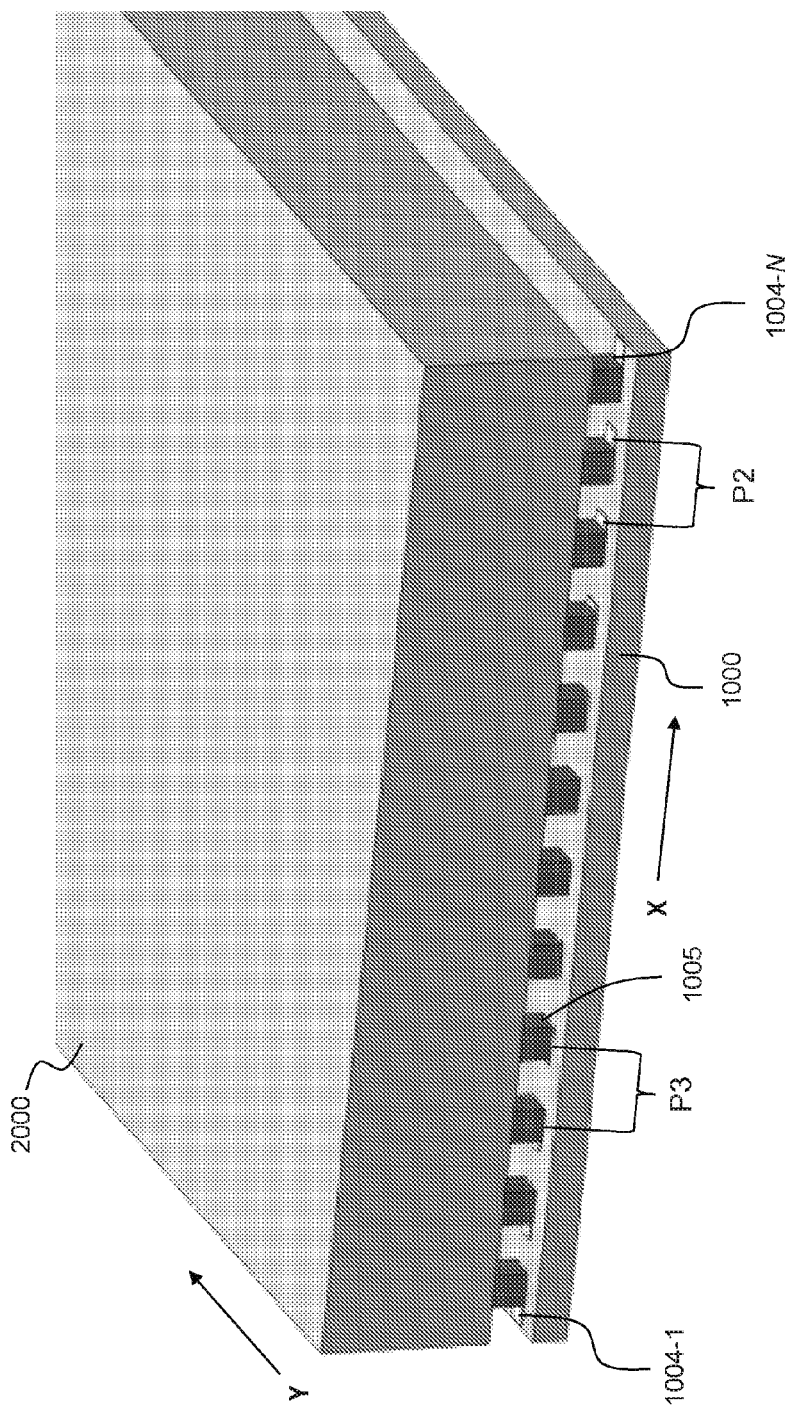
FIG. 6 illustrates an example embodiment of a device including an array of acoustic element circuits each having a corresponding pad and an interconnection bump, and an acoustic transducer disposed on the interconnection bumps.

FIG. 6 illustrates an example embodiment of a device 60 including an array of acoustic element circuits each having a corresponding pad 1004 and an interconnection bump 1005, and an acoustic transducer 2000 disposed on interconnection bumps 1005.

Significantly, as shown in FIG. 6 the second pitch P2 of pads 1004 is greater than the first pitch P1 of acoustic element circuits 1002. As a result, in the specific embodiment illustrated in FIG. 6, first pad 1004-1 and last pad 1004-N are disposed along opposite sides of the corresponding acoustic element circuits 1002 with respect to each other.

Each of the interconnection bumps 1005 is electrically conductive and in electrical contact or connection with a corresponding one of the pads 1004 and electrically connects the pad 1004, and thereby the corresponding acoustic element circuit, with acoustic transducer 2000. Acoustic transducer 2000, which for example may be a piezoelectric transducer, is configured to convert a received electrical signal to a sound wave, and conversely to convert a received sound wave to an electrical signal.

Interconnection bumps 1005 are disposed at a third pitch P3 in at least the X direction (and in some embodiments, in both the X direction and the Y direction). Here, again, "pitch" is understood to mean an average spacing between the centers of two elements which are closest to each other, allowing for the case of a uniform spacing as well as any other distribution with the same location of the end elements as a uniformly spaced distribution would have. In particular, the third pitch P3 represents the average spacing between the centers of two elements which are closest to each other (i.e., adjacent). In some embodiments, the third pitch P3 may be uniform or substantially uniform among interconnection bumps 1005.

In general, the third pitch P3 of interconnection bumps 1005 may be different from the second pitch P2 of pads 1004 and/or the first pitch P1 of acoustic element circuits 1002. However, in some embodiments, as described below, the third pitch P3 of interconnection bumps 1005 may be the same as or substantially the same as the second pitch P2 of pads 1004, while in other embodiments, the third pitch P3 of interconnection bumps 1005 may be the same as or substantially the same as the first pitch P1 of acoustic element circuits 1002.

Figure 7:
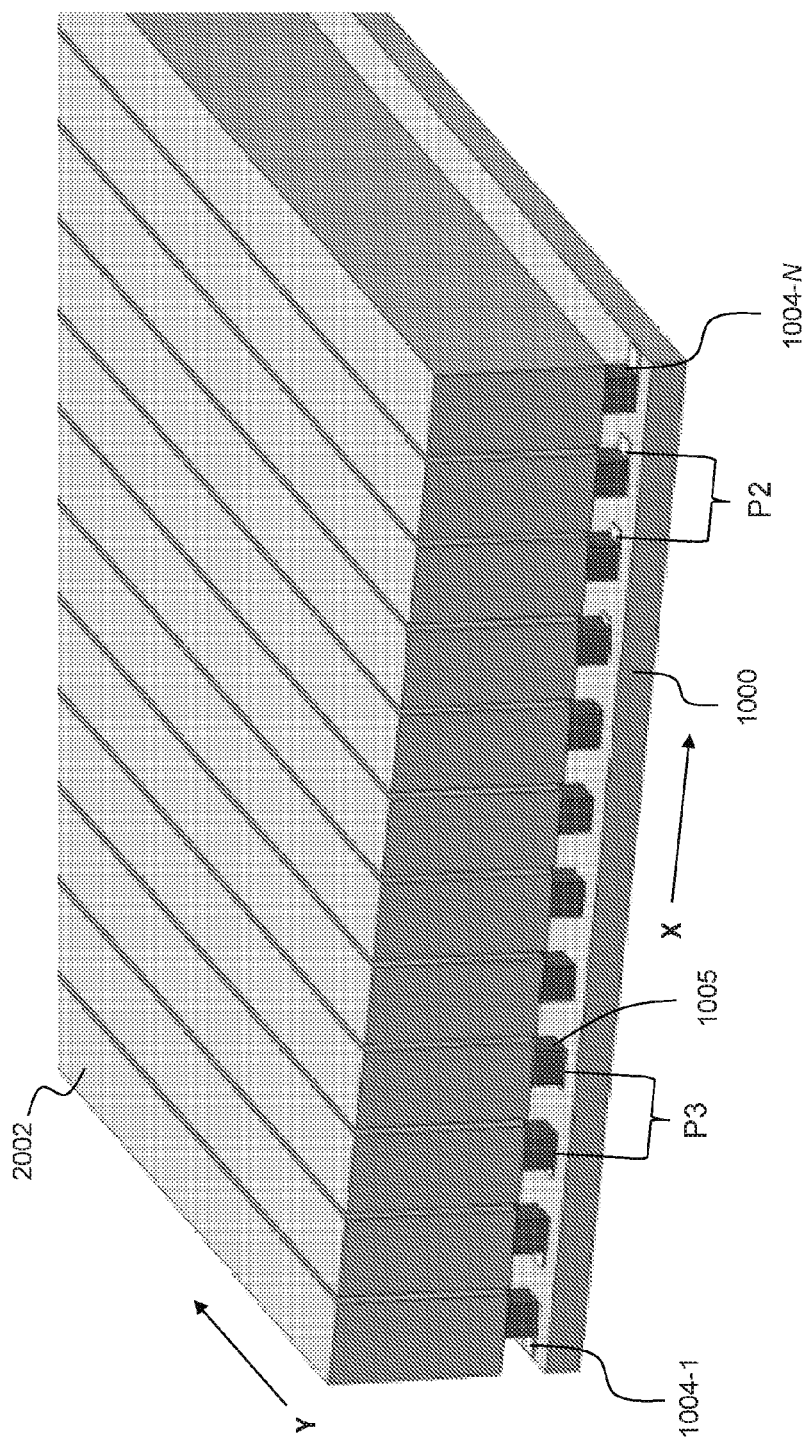
FIG. 7 illustrates an embodiment of a device including an array of acoustic element circuits each having a corresponding pad and an interconnection bump, and plurality of acoustic transducer elements disposed on the interconnection bumps.

FIG. 7 illustrates a first example embodiment of a device 70 including an array of acoustic element circuits each having a corresponding pad 1004 and an interconnection bump 1005, and plurality of acoustic transducer elements 2002 disposed on the interconnection bumps 1005.

Figure 8:
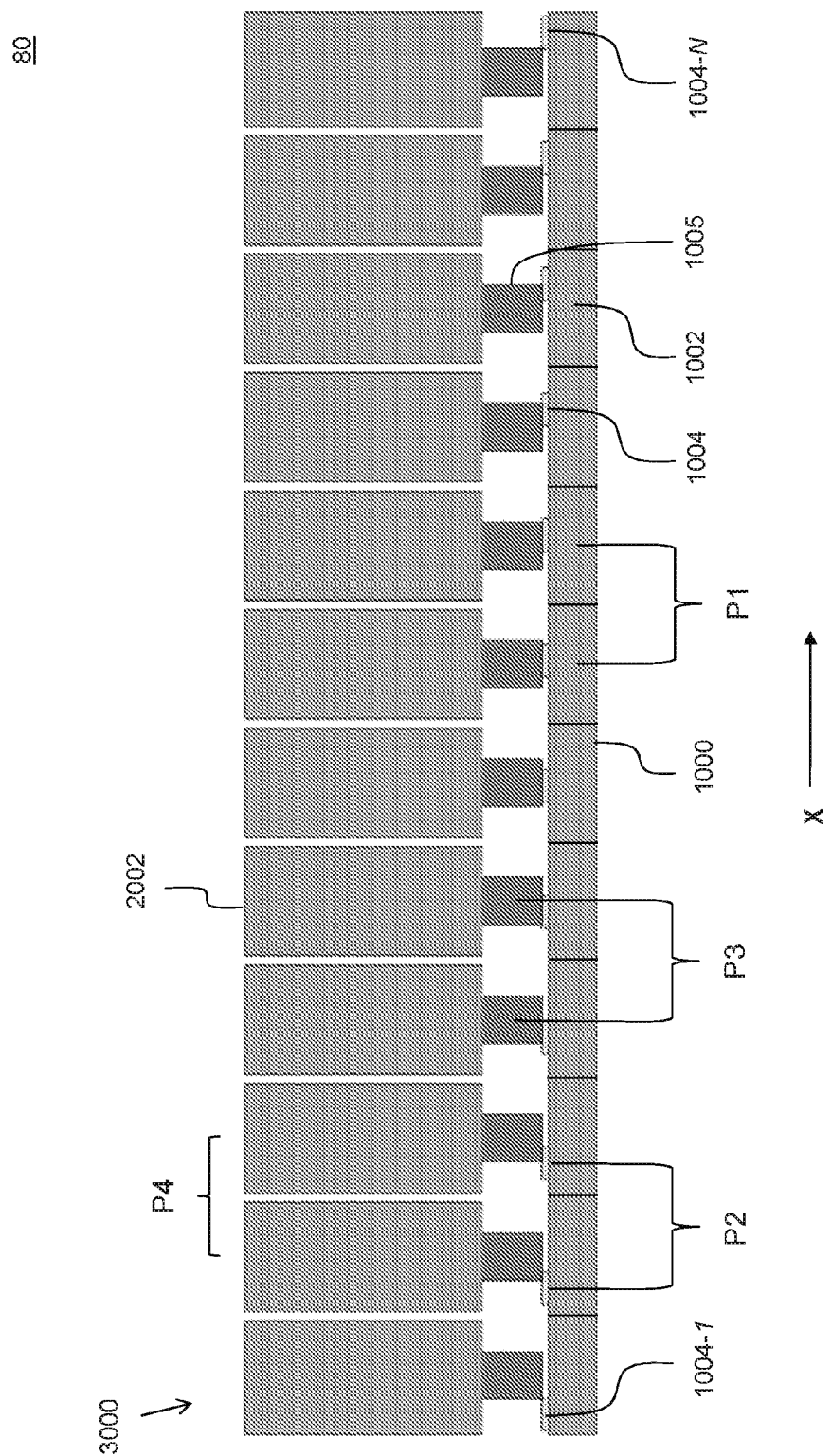
FIG. 8 illustrates a first example embodiment of an acoustic array component including an array of acoustic elements.

FIG. 8 illustrates a first example embodiment of an acoustic array component 80 including an array of acoustic elements 3000. Each acoustic element 3000 includes an acoustic element circuit 1002, with a corresponding pad 1004, an acoustic transducer element 2002, and an interconnection bump 1005. More specifically, acoustic array component 80 comprises: an array of acoustic element circuits 1002 disposed contiguous to each other at a first pitch P1; a plurality of pads 1004 each corresponding to one of the acoustic element circuits 1002 and formed within a circuitry area of the corresponding acoustic element circuit 1002, pads 1004 being disposed at a second pitch P2; a plurality of interconnection bumps 1005 each corresponding to one of the pads 1004 and being disposed in electrical connection with the corresponding pad 1004; and a plurality of acoustic transducer elements 2002 disposed on the interconnection bumps. In some embodiments, the array of acoustic elements 3000 may be two dimensional, in which case the array of acoustic element circuits 1002, pads 1004, etc. may also be two dimensional.

Significantly, as shown in FIG. 8 the second pitch P2 of pads 1004 is greater than the first pitch P1 of acoustic element circuits 1002. As a result, in the specific embodiment illustrated in FIG. 4, first pad 1004-1 and last pad 1004-N are disposed along opposite sides of the corresponding acoustic element circuits 1002 with respect to each other.

Interconnection bumps 1005 are disposed at the third pitch P3 as discussed above with respect to FIG. 6. Furthermore, acoustic transducer elements 2002 are disposed at a fourth pitch P4 in at least the X direction (and in some embodiments, in both the X direction and the Y direction, which is into the page in FIG. 8). Here, again, "pitch" is understood to mean an average spacing between the centers of two elements which are closest to each other, allowing for the case of a uniform spacing as well as any other distribution with the same location of the end elements as a uniformly spaced distribution would have. In particular, the fourth pitch P4 represents the average spacing between the centers of two elements which are closest to each other (i.e., adjacent). In some embodiments, the fourth pitch P4 may be uniform or substantially uniform throughout acoustic array component 80.

In the example embodiment illustrated in FIG. 8, the third pitch P3 of interconnection bumps 1005 is the same or substantially the same as the first pitch P1 of the acoustic element circuits 1002. Furthermore, the fourth pitch P4 of acoustic transducer elements 2002 is also the same or substantially the same as the first pitch P1 of the acoustic element circuits 1002.

Figure 9:
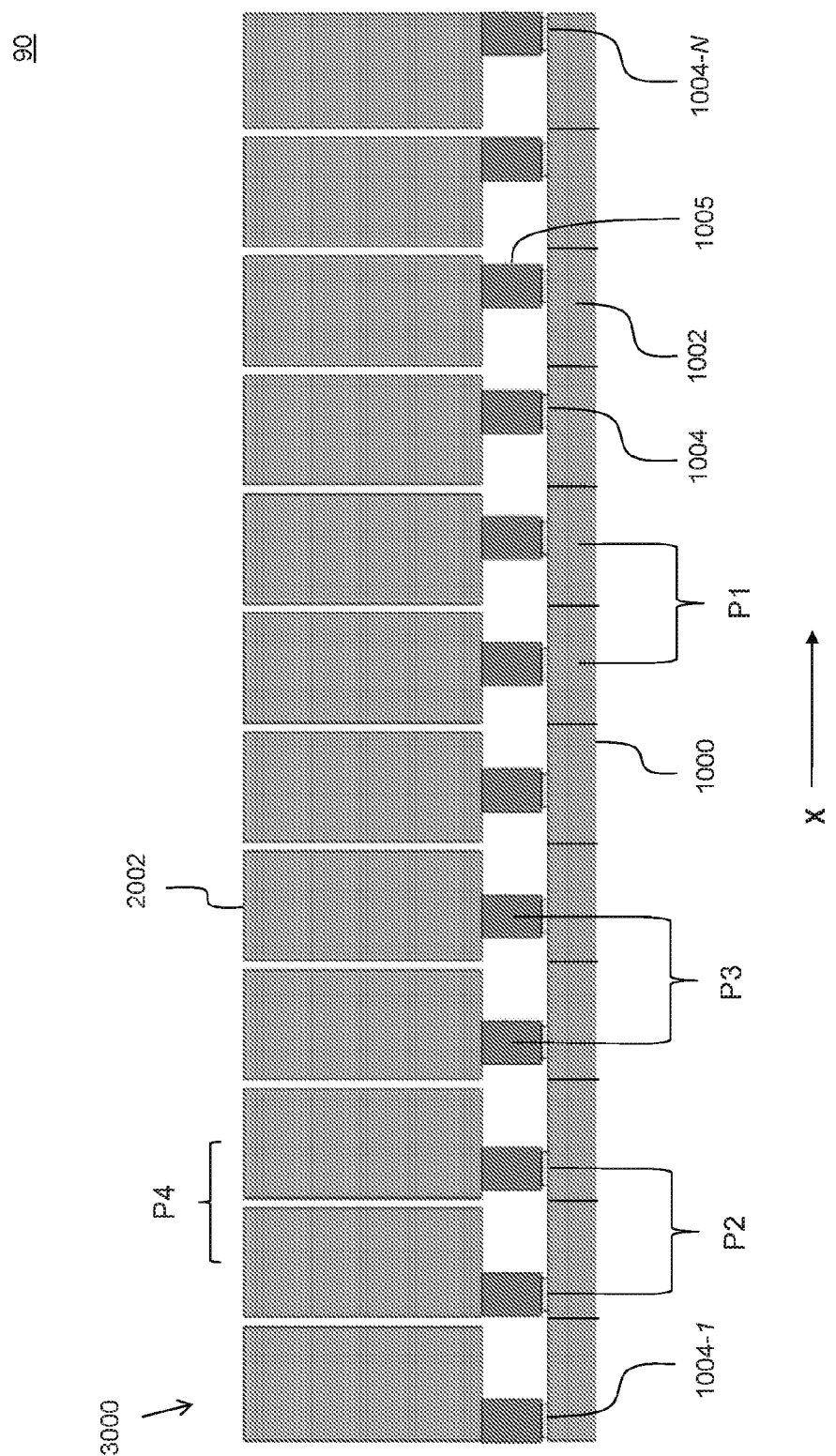
FIG. 9 illustrates a second example embodiment of an acoustic array component including an array of acoustic elements.

FIG. 9 illustrates a second example embodiment of an acoustic array component 90 including an array of acoustic elements 3000. Acoustic array component 90 is similar to acoustic array component 80, and so for brevity of explanation, only the differences will be discussed. In particular, in comparison to acoustic array component 80, in acoustic array component 90 the third pitch P3 of interconnection bumps 1005 is the same or substantially the same as the second pitch P2 of pads 1004. However, in similarity to acoustic array component 80, in acoustic array component 90 the fourth pitch P4 of acoustic transducer elements 2002 is the same or substantially the same as the first pitch P1 of the acoustic element circuits 1002.

Figure 10:
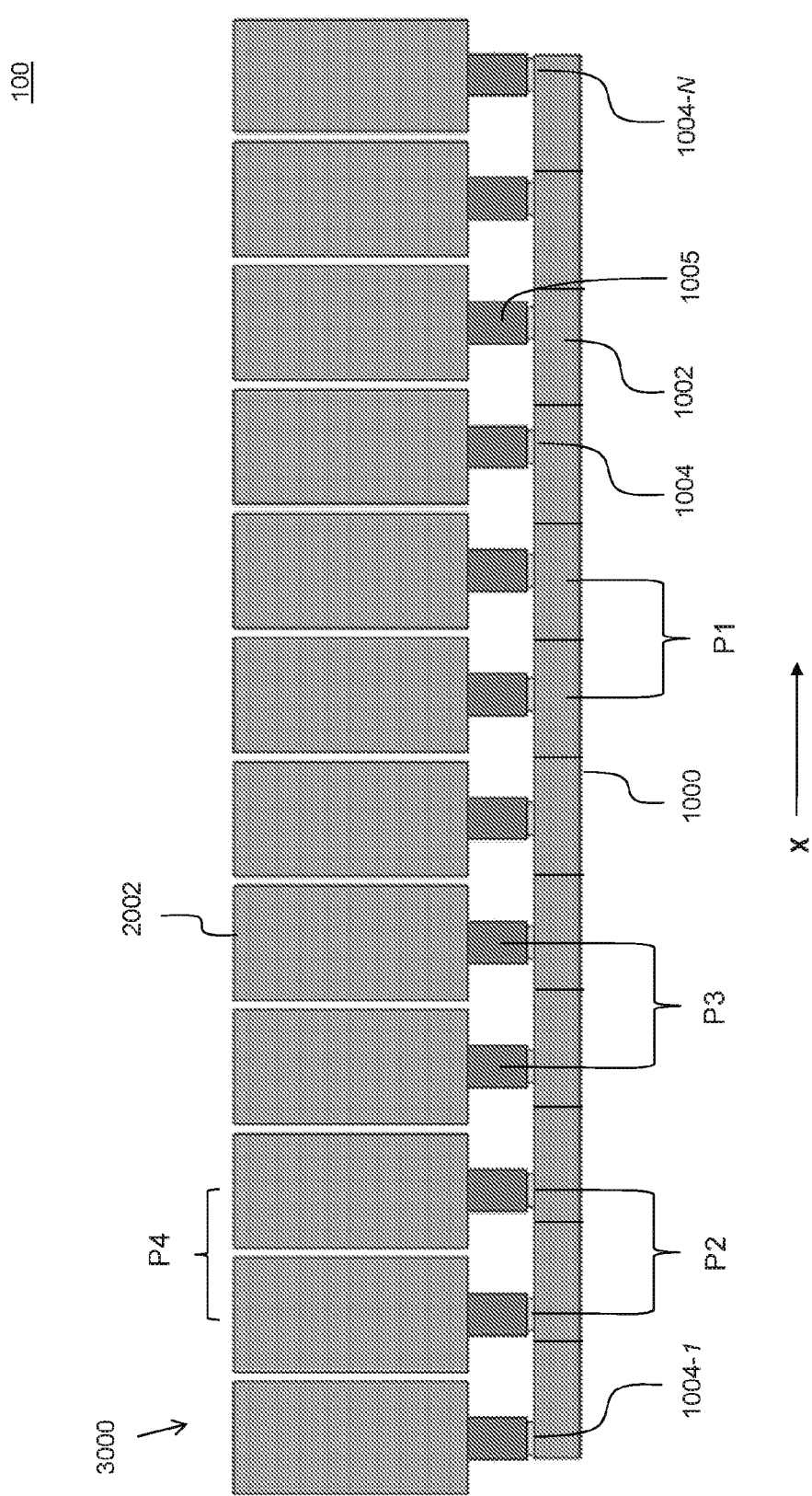
FIG. 10 illustrates a third example embodiment of an acoustic array component including an array of acoustic elements.

FIG. 10 illustrates a third example embodiment of an acoustic array component 100 including an array of acoustic elements 3000. Acoustic array component 100 is similar to acoustic array component 80, and so for brevity of explanation, only the differences will be discussed. In particular, in comparison to acoustic array component 80, in acoustic array component 100 the third pitch P3 of interconnection bumps 1005 is the same or substantially the same as the second pitch P2 of pads 1004. Furthermore, in acoustic array component 100 the fourth pitch P4 of acoustic transducer elements 2002 is also the same or substantially the same as the second pitch P2 of pads 1004.

Figure 11:
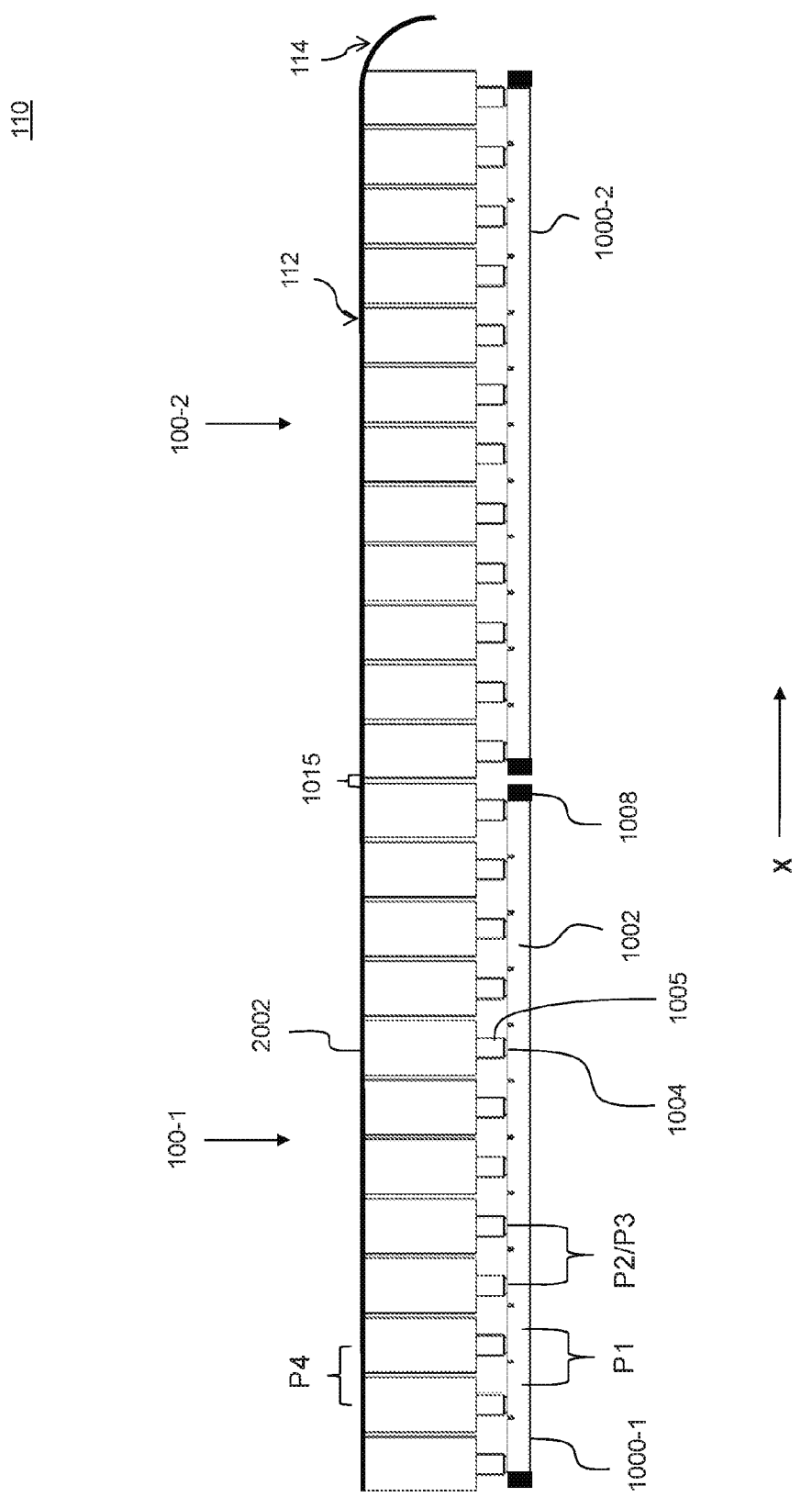
FIG. 11 illustrates a portion of a first embodiment of an acoustic array.

FIG. 11 illustrates a portion of a first embodiment of an acoustic array 110 which may be employed in place of acoustic array 12 in imaging system 1 as illustrated in FIG. 1. Acoustic array 110 includes a plurality of acoustic array components 100, including a first acoustic array component 100-1 and a second acoustic array component 100-2, which are spaced apart and separated by each other. Also shown in FIG. 11 are a ground plane 112 for the acoustic transducer elements 2002 of first and second acoustic array components 100-1 and 100-2, and a ground return 114 connected to ground plane 112. Acoustic array 110 may include a plurality of other acoustic array components 100 not shown in FIG. 11. In some embodiments, acoustic array may include a two dimensional array of acoustic array components 100, for example a 3×2 array.

Acoustic circuit elements 1002 and pads 1004 of first acoustic array component 100-1 are formed in a first circuit region 1000-1, and the acoustic circuit elements 1002 and pads 1004 of second acoustic array component 100-2 are formed in a second circuit region 1000-2. Each of the first and second circuit regions 1000-1 and 1000-2 has a border 1008 along the edges or side thereof, which may comprise all or a portion of a scribe line for a die on which the corresponding circuit region 1000 is provided.

In some embodiments, the dies for first circuit region 1000-1 and second circuit region 1000-2 may be provided on a same semiconductor substrate as each other. In other embodiments, the dies for first circuit region 1000-1 and second circuit region 1000-2 may be provided on different semiconductor substrates from each other.

Significantly, as shown in FIGS. 10 and 11, the second pitch P2 of pads 1004 is greater than the first pitch P1 of acoustic element circuits 1002. As a result, in the specific embodiment illustrated in FIG. 11, first pad 1004-1 and last pad 1004-N are disposed along opposite sides of the corresponding acoustic element circuits 1002 with respect to each other.

Additionally, the third pitch P3 of interconnection bumps 1005 and the fourth pitch P4 of acoustic transducer elements 2002 are also the same or substantially the same as the second pitch P2 of pads 1004.

The acoustic array components 100 of acoustic array 110 may be provided on a surface of an acoustic probe, for example a curved surface.

Beneficially, with the arrangement of pads 1004 having a greater pitch than acoustic element circuits 1002, when first and second acoustic array components 100-1 and 100-2 are placed next to each other, in acoustic array 110 the gap 1015 between the acoustic transducer element 2002 at one edge of first acoustic array component 100-1 and the adjacent acoustic transducer element 2002 at the adjacent and opposite edge of second acoustic array component 100-2 is the same or substantially the same as the gap between adjacent acoustic transducer element 2002 of the same acoustic array component 100. As a result, the construction of a uniform array of acoustic elements 3000, and in particular a uniform array of acoustic transducer elements 2002, can be provided even when acoustic elements 3000 are provided on two or more semiconductor dies (which may be on the same substrate, or on separate substrates).

Figure 12:
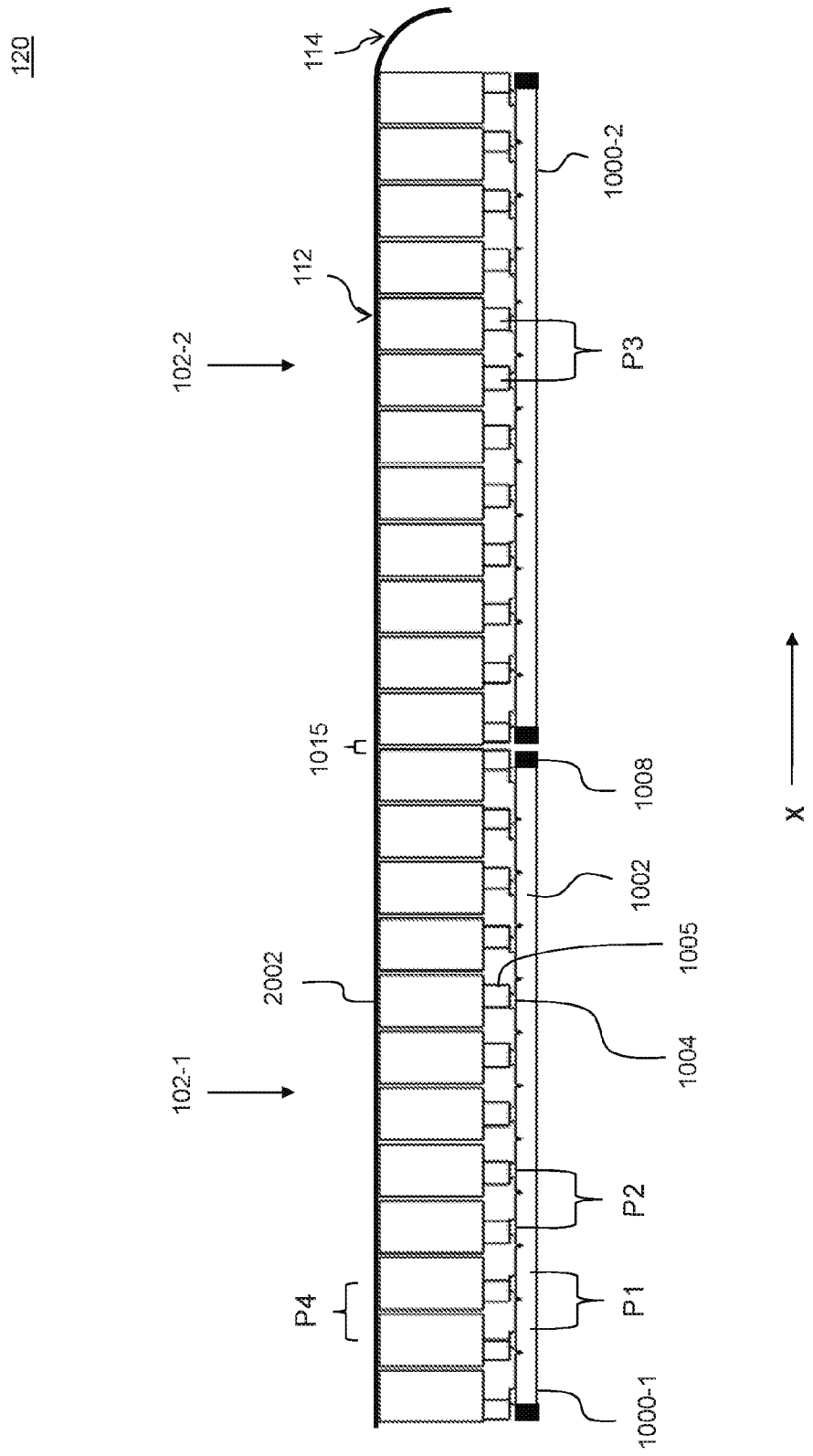
FIG. 12 illustrates a portion of a second embodiment of an acoustic array.

FIG. 12 illustrates a portion of a second embodiment of an acoustic array 120 which may be employed in place of acoustic array 12 in imaging system 1 as illustrated in FIG. 1. Acoustic array 120 is similar to acoustic array 110, and so for brevity of explanation, only the differences will be discussed. In particular, acoustic array 120 includes first and second acoustic array components 102-1 and 102-2 which may be identical or substantially identical to each other. Acoustic array 120 may include a plurality of other acoustic array components not shown in FIG. 12. In some embodiments, acoustic array may include a two dimensional array of acoustic array components 102, for example a 3×2 array.

Acoustic array components 102-1 and 102-2 may each be similar to acoustic array component 100 illustrated in FIGS. 10 and 11 and discussed above, with a difference being that in acoustic array components 102-1 and 102-2, the third pitch P3 of interconnection bumps 1005 is greater than the second pitch P2 of pads 1004, while the fourth pitch P4 of acoustic transducer elements 2002 is the same or substantially the same as the second pitch P2 of pads 1004.

Similarly to acoustic array 110, in acoustic array 120 the gap 1015 between the acoustic transducer element 2002 at one edge of first acoustic array component 102-1 and the adjacent acoustic transducer element 2002 at the adjacent and opposite edge of second acoustic array component 102-2 is the same or substantially the same as the gap between adjacent acoustic transducer element 2002 of the same acoustic array component 102. As a result, the construction of a uniform array of acoustic elements 3000, and in particular a uniform array of acoustic transducer elements 2002, can be provided even when acoustic elements 3000 are provided on two or more semiconductor dies (which may be on the same substrate, or on separate substrates).

Figure 13:
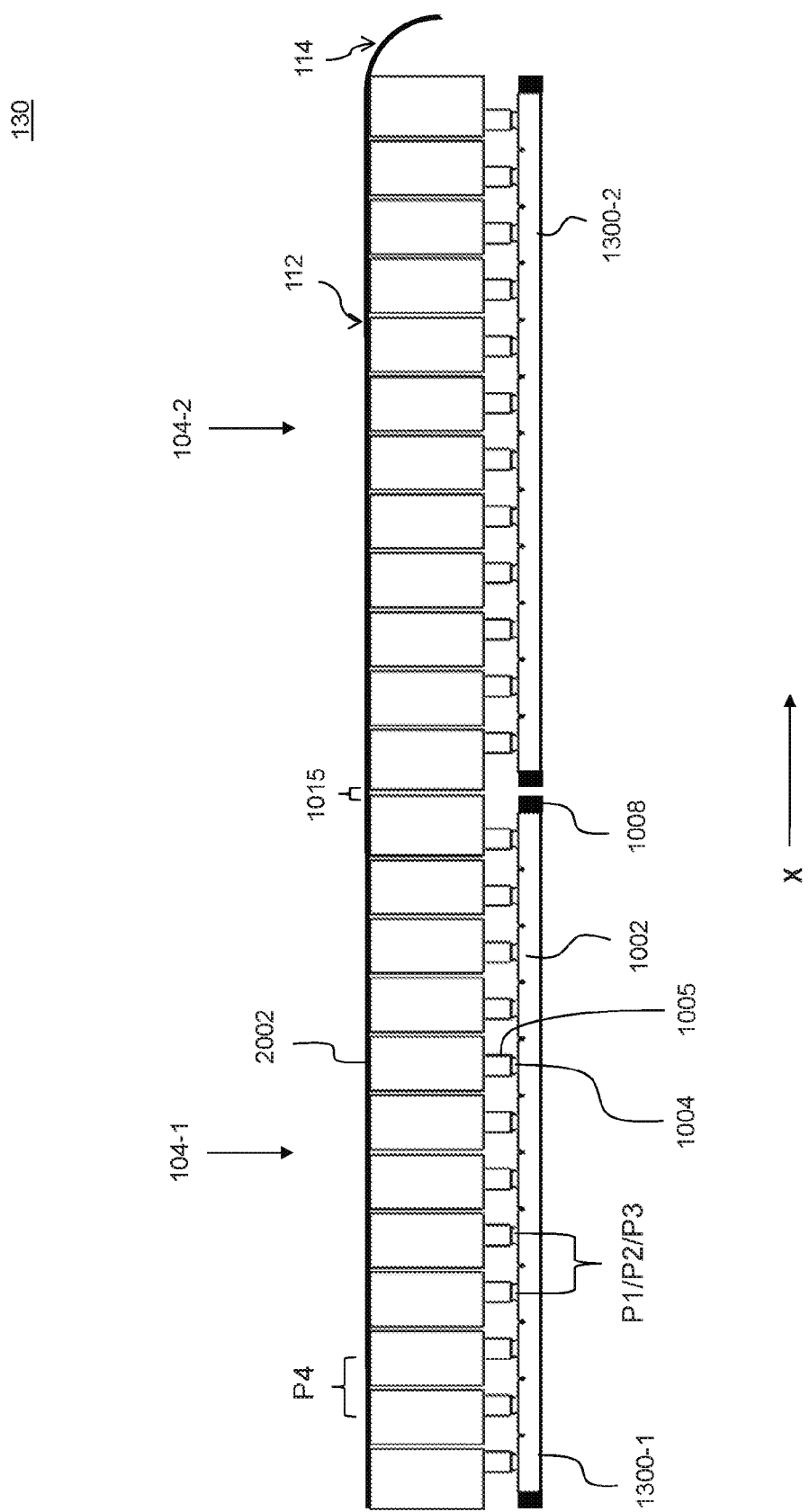
FIG. 13 illustrates a portion of a third embodiment of an acoustic array.

FIG. 13 illustrates a portion of a third embodiment of an acoustic array 130 which may be employed in place of acoustic array 12 in imaging system 1 as illustrated in FIG. 1. Acoustic array 130 includes first and second acoustic array components 104-1 and 104-2 which may be identical or substantially identical to each other. Acoustic array 130 may include a plurality of other acoustic array components not shown in FIG. 13. In some embodiments, acoustic array may include a two dimensional array of acoustic array components 104, for example a 3×2 array.

Acoustic circuit elements 1002 and pads 1004 of first acoustic array component 104-1 are formed in a first circuit region 1300-1, and the acoustic circuit elements 1002 and pads 1004 of second acoustic array component 104-2 are formed in a second circuit region 1300-2. Each of the first and second circuit regions 1000-1 and 1000-2 has border 1008 along the edges or side thereof, which may comprise all or a portion of a scribe line for a die on which the corresponding circuit region 1300 is provided.

In some embodiments, the dies for first circuit region 1300-1 and second circuit region 1300-2 may be provided on different semiconductor substrates from each other.

Significantly in contrast to acoustic arrays 110 and 120, in acoustic array 130 the second pitch P2 of pads 1004 and the first pitch P1 of acoustic element circuits 1002 are the same as each other. More specifically, in each of the circuit regions 1300, first pad 1004-1 and last pad 1004-N are disposed in the same relative position in their corresponding acoustic element circuits 1002-1 and 1002-N as each other.

The acoustic array components 104 of acoustic array 130 may be provided on a surface of an acoustic probe, for example a curved surface.

Additionally, as shown in FIG. 13, in acoustic array 130, and in each of the first and second acoustic array components 104-1 and 104-2, the third pitch P3 of interconnection bumps 1005 is the same as the first pitch P1 of acoustic circuit elements 102 and the second pitch P2 of pads 1004, while the fourth pitch P4 of acoustic transducer elements 2002 is greater than the first pitch P1 of acoustic circuit elements 102, the second pitch P2 of pads 1004, and the third pitch P3 of interconnection bumps 1005.

Beneficially, with this arrangement, when first and second acoustic array components 104-1 and 104-2 are placed next to each other, in acoustic array 130 the gap 1015 between the acoustic transducer element 2002 at one edge of first acoustic array component 104-1 and the adjacent acoustic transducer element 2002 at the adjacent and opposite edge of second acoustic array component 104-2 is the same or substantially the same as the gap between adjacent acoustic transducer element 2002 of the same acoustic array component 104. As a result, the construction of a uniform array of acoustic elements 3000, and in particular a uniform array of acoustic transducer elements 2002, can be provided even when acoustic elements 3000 are provided on two or more different semiconductor dies.

Figure 14:
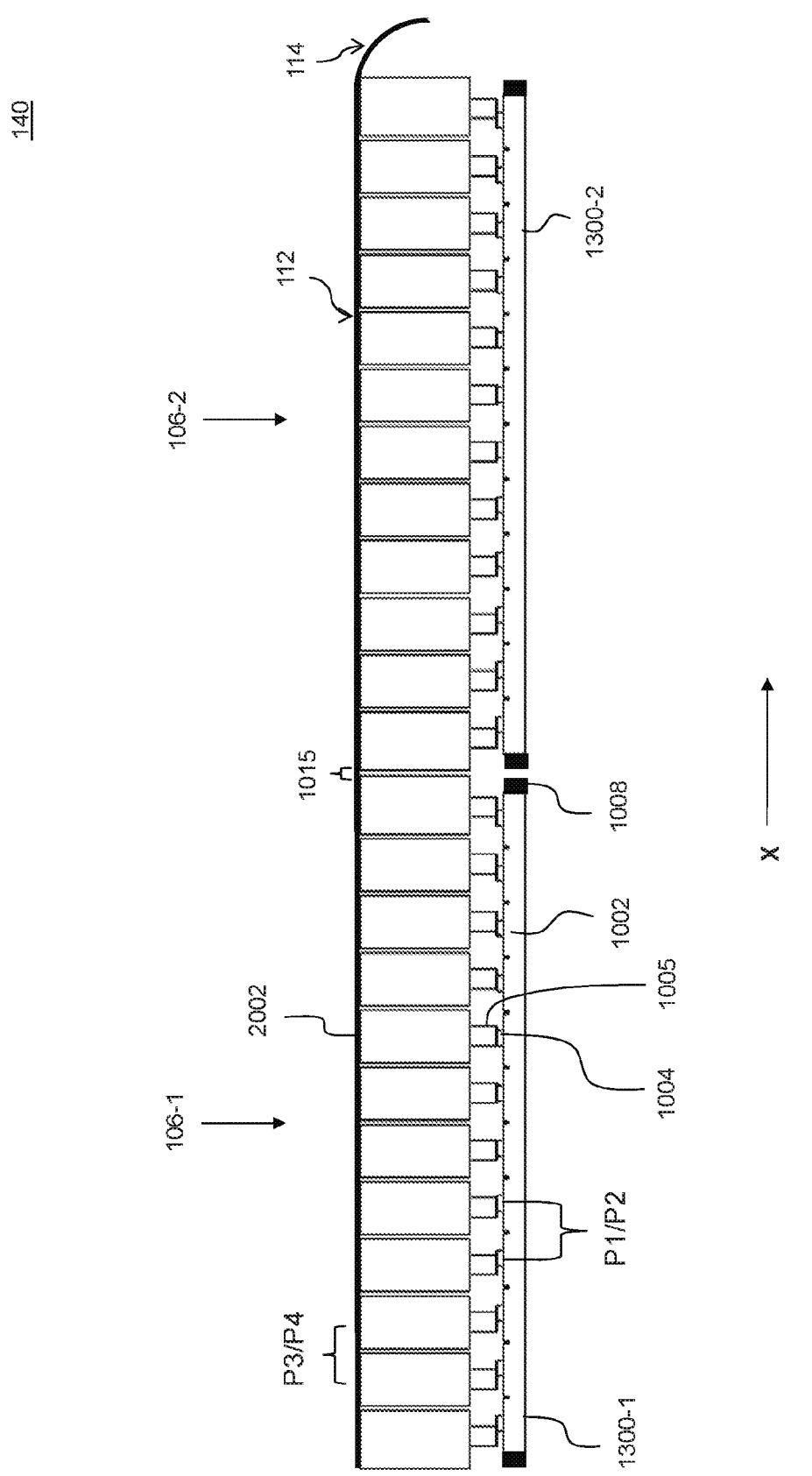
FIG. 14 illustrates a portion of a fourth embodiment of an acoustic array.

FIG. 14 illustrates a portion of a fourth embodiment of an acoustic array 140 which may be employed in place of acoustic array 12 in imaging system 1 as illustrated in FIG. 1.

Acoustic array 140 is similar to acoustic array 110, and so for brevity of explanation, only the differences will be discussed. In particular, acoustic array 140 includes first and second acoustic array components 106-1 and 106-2 which may be identical or substantially identical to each other. Acoustic array 140 may include a plurality of other acoustic array components not shown in FIG. 14. In some embodiments, acoustic array may include a two dimensional array of acoustic array components 106, for example a 3×2 array.

Acoustic array components 106-1 and 106-2 may each be similar to acoustic array component 104 illustrated in FIG. 13 and discussed above, with the difference being that in acoustic array components 106-1 and 106-2, the third pitch P3 of interconnection bumps 1005 is the same as the fourth pitch P4 of acoustic transducer elements 2002, so that both the third pitch P3 and the fourth pitch P4 are greater than the second pitch P2 of pads 1004 and the first pitch P1 of acoustic circuit elements 102.

Similarly to acoustic array 110, in acoustic array 120 the gap 1015 between the acoustic transducer element 2002 at one edge of first acoustic array component 106-1 and the adjacent acoustic transducer element 2002 at the adjacent and opposite edge of second acoustic array component 106-2 is the same or substantially the same as the gap between adjacent acoustic transducer element 2002 of the same acoustic array component 106. As a result, the construction of a uniform array of acoustic elements 3000, and in particular a uniform array of acoustic transducer elements 2002, can be provided even when acoustic elements 3000 are provided on two or more different semiconductor dies.

Although acoustic arrays 110, 120, 130 and 140 have been described in detail as example embodiments, in general it should be understood that other embodiments are possible, including, for example, acoustic arrays which employ acoustic array components 80 and 90 described above.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the scope of the appended claims.

What is claimed is:

1. A device, comprising:
    an acoustic probe having a plurality of acoustic array components separated and spaced apart from each other, each of the acoustic array components comprising:
        an array of acoustic element circuits disposed contiguous to each other at a first pitch in at least a first direction;
        a plurality of pads each corresponding to one of the acoustic element circuits and formed within a circuitry area of the corresponding acoustic element circuit, the pads being arranged at a second pitch in at least the first direction;
        a plurality of interconnection bumps each corresponding to one of the pads and being disposed directly on, and in electrical connection with the corresponding pad, wherein the interconnection bumps are disposed at a third pitch in at least the first direction; and
        a plurality of acoustic transducer elements disposed directly on the interconnection bumps, wherein the acoustic transducer elements are disposed at a fourth pitch in at least the first direction,
        wherein at least two of the first, second, third, and fourth pitches are different than each other.

2. The device of claim 1, wherein the third pitch is greater than the second pitch.

3. The device of claim 1, wherein the fourth pitch is greater than the third pitch.

4. The device of claim 1, wherein the second pitch is greater than the first pitch.

5. The device of claim 4, wherein the second pitch, third pitch, and fourth pitch are approximately the same as each other.

6. The device of claim 4, wherein the fourth pitch is substantially the same as the second pitch and the third pitch is greater than the fourth pitch.

7. The device of claim 1, wherein the second pitch is approximately the same as the first pitch.

8. The device of claim 7, wherein the third pitch is approximately the same as the first pitch, and the fourth pitch is greater than the first pitch.

9. The device of claim 7, wherein the third pitch is greater than the first pitch, and the fourth pitch is approximately the same as the third pitch.

10. The device of claim 1, wherein at least a first acoustic array component and a second acoustic array component among the plurality of acoustic array components are provided together on a common semiconductor substrate, wherein the pads of the first and second acoustic array components together form an array of pads, and wherein the pads of the first and second acoustic array components have a substantially uniform pitch throughout the array of pads.

11. The device of claim 10, wherein the acoustic transducer elements of the first and second acoustic array components together form an array of acoustic transducer elements, and wherein the acoustic transducer elements of the first and second acoustic array components have a substantially uniform pitch throughout the array of acoustic transducer elements.

12. The device of claim 1, wherein at least a first acoustic array component and a second acoustic array component among the plurality of acoustic array components are provided on different semiconductor substrates than each other, wherein the pads of the first and second acoustic array components together form an array of pads, and wherein the pads of the first and second acoustic array components have a substantially uniform pitch throughout the array of pads.

13. The device of claim 12, wherein the acoustic transducer elements of the first and second acoustic array components together form an array of acoustic transducer elements, and wherein the acoustic transducer elements of the first and second acoustic array components have a of acoustic transducer elements uniform pitch throughout the array of acoustic transducer elements.

14. A device, comprising:
a substrate including at least first and second circuit regions, wherein the first circuit region and the second circuit region are separated and spaced apart from each other by a scribing lane for scribing die from the substrate, each of the circuit regions comprising:
an array of acoustic element circuits disposed at a first pitch in at least a first direction; and
a plurality of pads each corresponding to one of the acoustic element circuits and formed within a circuitry area of the corresponding acoustic element circuit,
wherein the pads of the first and second circuit regions together form an array of pads having a substantially uniform pitch in at least the first direction throughout the array of pads, where the uniform pitch is a second pitch which is greater than the first pitch.

15. The device of claim 14, wherein the array of acoustic element circuits includes: a first acoustic element circuit at a first end of the array, the first acoustic element having a corresponding first pad; and
a last acoustic element circuit at a second end of the array which is opposite the first end of the array, the last acoustic element having a corresponding last pad,
wherein the first and last pads are disposed along opposite sides of the corresponding acoustic element circuits with respect to each other.

16. The device of claim 14, wherein the substrate includes at least third and fourth circuit regions, wherein the first, second, third, and fourth circuit regions form a two dimensional array and are separated and spaced apart from each other by one or more scribing lanes.

17. The device of claim 14, further comprising a plurality of interconnection bumps each corresponding to one of the pads and being disposed in electrical connection with the corresponding pad.

18. The device of claim 17, further comprising a plurality of acoustic transducer elements on the interconnection bumps.

19. A device, comprising:
an array of acoustic element circuits disposed on a substrate at a first pitch in at least a first direction; and
a plurality of pads each corresponding to one of the acoustic element circuits and formed within a circuitry area of the corresponding acoustic element circuit, the pads being disposed at a second pitch in at least the first direction,
wherein the second pitch is greater than the first pitch.

20. The device of claim 19, wherein the array of acoustic element circuits includes:
a first acoustic element circuit at a first end of the array, the first acoustic element having a corresponding first pad; and
a last acoustic element circuit at a second end of the array which is opposite the first end of the array, the last acoustic element having a corresponding last pad,
wherein the first and last pads are disposed along opposite sides of the corresponding acoustic element circuits with respect to each other.

21. The device of claim 19, further comprising:
a plurality of interconnection bumps each corresponding to one of the pads and being disposed in electrical connection with the corresponding pad; and
a plurality of acoustic transducer elements disposed on the interconnection bumps.

* * * * *